United States Patent [19]
Artusi et al.

[11] Patent Number: 4,583,350
[45] Date of Patent: Apr. 22, 1986

[54] PROCESS AND DEVICE IN PARTICULAR FOR SEALING CONTAINERS WITH A FOIL OR THE LIKE MATERIAL

[76] Inventors: Aldo Artusi, Mühleboden 66, CH-8461 Trüllikon; Peter Hagmänn, Bielstr. 95, CH-4500 Solothurn, both of Switzerland

[21] Appl. No.: 568,205
[22] PCT Filed: Mar. 22, 1983
[86] PCT No.: PCT/EP83/00083
  § 371 Date: Nov. 21, 1983
  § 102(e) Date: Nov. 21, 1983
[87] PCT Pub. No.: WO83/03397
  PCT Pub. Date: Oct. 13, 1983

[30] Foreign Application Priority Data
  Mar. 23, 1982 [DE] Fed. Rep. of Germany ....... 3210566

[51] Int. Cl.⁴ .......................... B65B 51/14; B65B 7/28
[52] U.S. Cl. ........................................ 53/478; 53/373; 156/69
[58] Field of Search ................ 53/373, 329, 390, 478; 156/580, 69, 581, 583.1, 515

[56] References Cited
U.S. PATENT DOCUMENTS

| 3,170,275 | 2/1965 | Rohdin et al. | 53/373 |
| 3,378,991 | 4/1968 | Anderson | 53/373 |
| 3,392,506 | 7/1968 | Haines | 53/373 |
| 4,082,941 | 4/1978 | Sukow et al. | 156/515 X |
| 4,226,072 | 10/1980 | Balzer et al. | 53/373 X |
| 4,447,284 | 5/1984 | Shanklin et al. | 53/373 X |

Primary Examiner—Horace M. Culver
Attorney, Agent, or Firm—Bachman & LaPointe

[57] ABSTRACT

Method and device for sealing containers wherein a foil or the like material is pressed on a container by means of a heater. An electromagnetic field is generated between a carrier and a counterpart by means of which field the carrier and counterpart are drawn together. As a result of this, the heating facility moves towards the container to be sealed.

18 Claims, 4 Drawing Figures

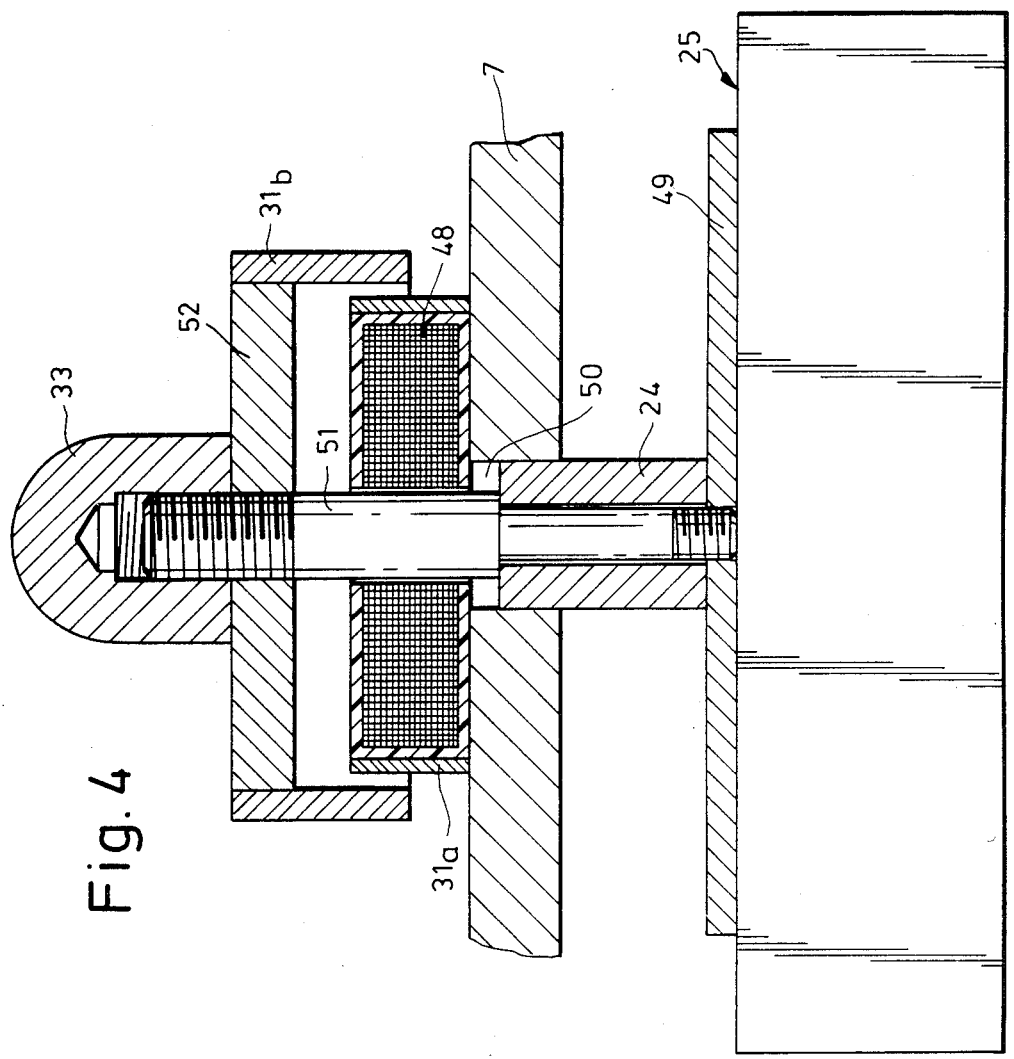

PROCESS AND DEVICE IN PARTICULAR FOR SEALING CONTAINERS WITH A FOIL OR THE LIKE MATERIAL

BACKGROUND OF THE INVENTION

The invention relates to a process in particular for sealing containers with a foil or the like material, whereby a heating facility with heating element is pressed onto the container which has a foil or the like laid on top of it. The present invention also relates to a device having a heating facility suspended from a cross head spanning two columns, below which heating facility the container with the foil or the like is situated.

It is common knowledge to the average man in the field that bodies can be moved by means of attractive or repulsive type magnets. Attractive type magnets draw bodies towards them, in that for example a carrier plate on which the body to be moved is situated is drawn with the body to another plate herein called a counterpart. This is brought about by applying currents of different polarity to the plates in question. In the case of repulsive type magnets on the other hand both the carrier plate and counterpart, a fixed plate, exhibit the same polarity so that they repell each other.

In the case of conventional sealing devices, the raising of the heating element takes place either by means of a hydraulic or pneumatic drive. These machines are of a size conceived for large throughputs. For this reason they are as a rule useable only in industrial production lines in which a large number of, for example, containers, has to be sealed in a particular unit time.

Also known are manually operated sealing devices, in which the heating element is lowered onto the container to be sealed via a bracket and hinge. This machine is also available in a small size for example for individual production purposes. It suffers, however, the disadvantage that neither the duration nor the magnitude of applied pressure can be kept constant, so that as a result there is non-uniformity in the quality of the seal. In addition they lower the operational and workplace safety. Furthermore, a pressure of only approximately 100 kg can be generated with these devices.

In the case of machines involving the movement of a pressure-foot or the like, repulsive type magnets are normally used. If the pressure provided by such a machine is to remain constant on removing carrier plate and other plate between which the electromagnetic field is created, the raising facility must be of a particular size or the voltage applied must be raised continuously. Consequently machines with repulsive type magnets occupy a large amount of space and are complicated in construction.

Attractive type magnetics, the advantage of which lies especially in the reduction of the distance between for example a magnet plate and a carrier plate on going into service, have up to now found no application in the technology of machines operating on the principle of pressure.

SUMMARY OF THE INVENTION

In view of the above, the object of the present invention is to develop a process and device for sealing containers whereby the sealing temperature, pressure and duration of applied pressure are kept constant. The device for this purpose should be simple and designed in as cost-favorable manner as possible, and should be small in size so that it can be applied in small scale businesses.

This object is achieved by way of the present invention in that the counterpart and/or carrier are used to generate a magnetic field by means of which the carrier is drawn towards the counterpart as a result of which the distance between the counterpart and the body increases.

If the carrier and the counterpart are grouped together under the term drive unit, then, in spite of the carrier and counterpart being drawn together, the distance between the drive unit and the body is increased, so that the machine can find application as a pressure generating machine. This way the movement of a repulsive magnet is combined with the advantages of an attractive magnetic.

The returning of the body to the starting position can for example be undertaken by setting up another magnetic field between carrier and counterpart, or by a mechanical energy storage means.

The counterpart is preferably situated between the body and the carrier, the body and carrier being connected by means of a connecting element introduced through an opening in the counterpart. It is, however, also within the scope of the invention for the connecting element to be situated outside the counterpart.

A device for carrying out the above-mentioned process is preferably so that a counterpart is situated between the body and its carrier and an electromagnetic field can be created between the counterpart and carrier. Also, provision is made for a crosshead which is attached to columns and which serves as holder for the counterpart, the carrier and body being connected by means of a connecting element introduced through an opening in the counterpart. The counterpart can also be set on the crosshead, the connecting piece in that case also penetrating the crosshead.

Foreseen is preferably for the body to be moveable against the forces of the stored energy means.

BRIEF DESCRIPTION OF THE DRAWINGS

Further advantages, features and details of the invention are revealed in the following description of a preferred examplified embodiment, and with the aid of the drawings, wherein:

FIG. 4 is an enlarged cross section of part of the device sectioned along line IV—IV in FIG. 2.

DETAILED DESCRIPTION

Figure 2:
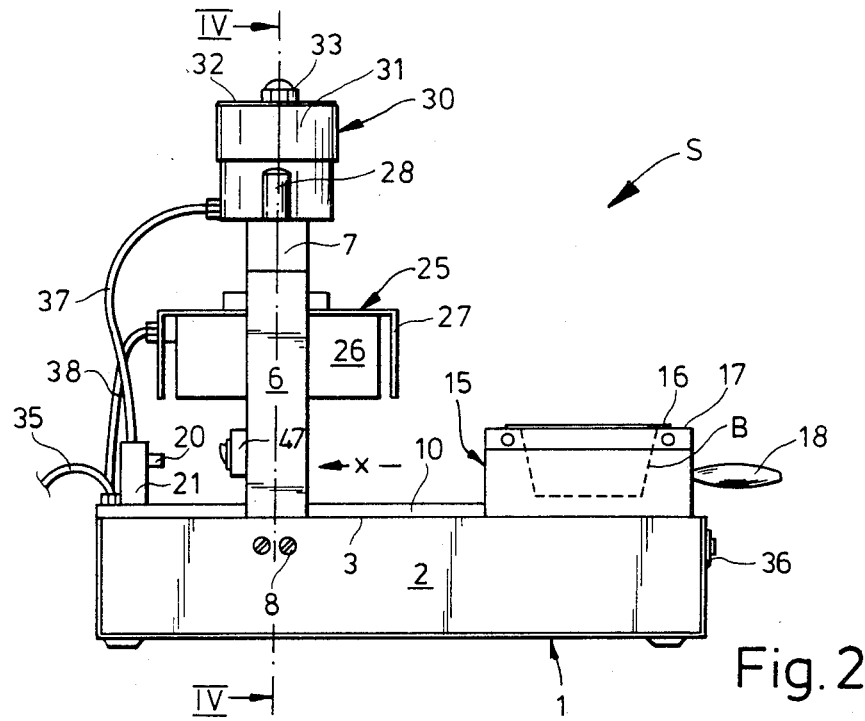
FIG. 2 is an end view of the device shown in FIG. 1.

A process of the above mentioned kind for sealing containers with a foil is preferably so that the heating facility is situated on a carrier, and a counterpart is inserted between the heating device and carrier, and that an electromagnetic field is created between carrier and counterpart, by means of which field carrier and counterpart are drawn together, as a result of which the heating facility moves away from the counterpart and towards the container to be sealed. In order to return the heating facility to the starting position an electromagnetic field can be generated between carrier and counterpart, by means of which field the heating facility is returned to its starting position. The return movement can, however, also be achieved by a machanical energy storage means.

With the process according to the invention it has been found advantageous if the container is pushed on a rail under the heating device and there actuates a push-button switch which initiates the setting up of an electromagnetic field.

The movement of the drive unit comprising carrier and counterpart is then determined by a time control unit. This allows a predetermined time for the heating element on the container and for the level of the voltage applied to the drive unit. Furthermore it is possible via the time control unit, after the heating element has been laid on the container, to increase the voltage applied to the drive unit, and thus increase the pressure.

A device of the kind described above is preferably so that the heating device is connected to a carrier via a rectangular bar or the like passing through the crosshead, and between carrier and heating device secured to the upper side of the crosshead is a counterpart which is also penetrated by a rectangular bar or threaded spindle, an electromagnetic field being developed between the carrier and counterpart as a result of which the carrier and counterpart pull each other closer.

As an attractive type magnet requires only little space, this device can function effectively on a small scale. Carrier and counterpart comprise for reasons of simplicity two metal plates with a voltage being applied to one or both. Employing a diameter of about 10 cm it was possible to produce a pressure of about 400 kg with that machine.

The carrier and counterpart are preferably accommodated in two parts of a protective casing, the part further removed from the crosshead containing and holding the carrier above the part containing the counterpart which is fixed to the upper side of the crosshead and such that the upper casing part is moveable over the lower part. As a result the drive unit is protected, but its movement not hindered.

The heating device, which is moveable up and down between columns, is suspended preferably on spiral springs acting as mechanical storage means attached to the crosshead. These mechanical storage means act against the attractive force of the electromagnetic field. It is also within the scope of the invention for these energy storage means to be omitted and the returning of the heating device to its original position to be achieved by reversing the polarity in the drive unit so that the carrier and the counterpart repel each other. Apart from the possibility of producing this machine in a very small size, mention must be made of the simplicity of the drive and therefore the low costs involved. It is thus possible for small businesses, which have to seal only a small number of containers per day, to employ this machine.

A further design aspect of the whole device is preferably so that the container is placed in a receptacle part with which the container can be pushed under the heating device on a rail. As such this rail comprises a tongue which is engaged with a groove in the receptacle part. At the end of the rail is a stand with a push-button switch which, in its operating position, the receptacle part actuates and sets the drive unit in motion.

It requires therefore only the manual step of placing the container in the receptacle, covering with foil and sliding the container receptacle part under the heating device. The subsequent, correct sealing step takes place completely automatically. To this end the heating device, drive unit, push-button switch and a tumbler switch, a transformer and time control unit are interconnected into a control circuit or system. By switching on the tumbler switch both the heating facility and, connected via the transformer and following time control unit, the drive unit are fed electric current, the actuating of the drive unit taking place only after the push-button switch is actuated.

An important component part in this control circuit is also the time control unit which determines the duration of the lowering of the heating device. It should preferably feature a switching facility which, after the heating device is lowered onto the container, increases the voltage in the drive unit and thus increases the pressure on the container.

The voltage to be applied to the drive unit is selected, among other things, also in accordance with the material to be sealed on to the container. In this respect plastic requires a lower pressure and therefore a lower voltage than for example cardboard. For this reason the invention gives preference to a switch, by means of which the transformer can be switched over to a higher power output.

The heating device preferably features two heating elements.

In all the machine is about 40 cm long, about 30 cm wide and about 40 cm high.

Figure 1:
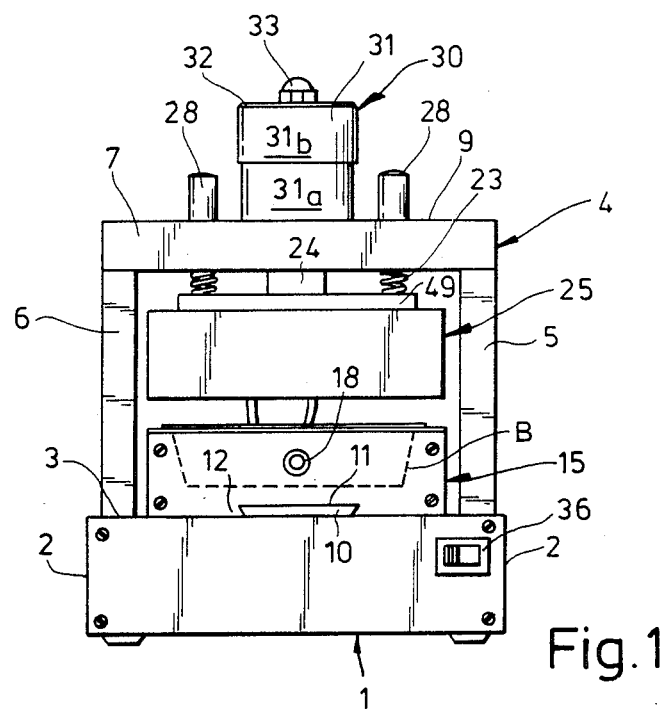
FIG. 1 is a front elevation of a device for sealing containers.

A threaded spindle is preferably screwed into the rectangular bar or a holder for the heating device, onto the other end of which spindle the carrier and cover nut are screwed. By turning the cover nut or the carrier the distance between the carrier and the counterpart can be changed and thus the depth to which the heating device can be lowered varied. Referring to the drawings, a device S, in particular for sealing container B, indicated by broken lines in FIGS. 1 and 2, features a supporting housing 1, on the long sides 2 of which and held by bolts 8 is a gate-like frame 4 of two columns 5 and 6 and crosshead 7 spanning the housing upper side 3.

In the, not shown, longitudinal axis of housing 1 on the upper side 3 is a rail 10 which engages with a groove 11 in the base 12 of a drawer 15. Residing in this drawer 15 is container B, the outward bent edges 16 of which rest on the upper side 17 of drawer 15.

The drawer 15, held at knob 8 and led in rail 10 and groove 11, can be moved along the longitudinal axis of housing 1. If moved in direction x (FIG. 2), it arrives between two columns 5 and 6 of frame 4 and presses on a push button 20 on a stand 21.

Suspended between the columns 5 and 6 on spiral springs 23 and a rectangular bar 24 is a holder 49 for a heating device 25 comprising heater 26 and hooding 27 thereof which is open at the bottom. Both the spiral springs 23 and the bar 24 pass through the crosshead 7. On the upper side 9 of the crosshead 7 the springs 23 are housed in sleeves 28 and secured at the base of the same, not shown here.

Between both sleeves 28 is a drive facility 30, the inner parts of which are surrounded by a protective casing 31 made up of a lower part 31a resting on the crosshead 7 and, capping the lower part 31a, and upper part 31b. At the base 32 of the upper part 31b is a cover nut 33.

To supply the device S with energy is a power supply line 35 which leads to a tumbler switch 36. Numeral 37 indicates a power line to the drive facility 30, and 38 wiring sheathed in a heat-resistant sleeve leading to the heating device 25.

Figure 3:
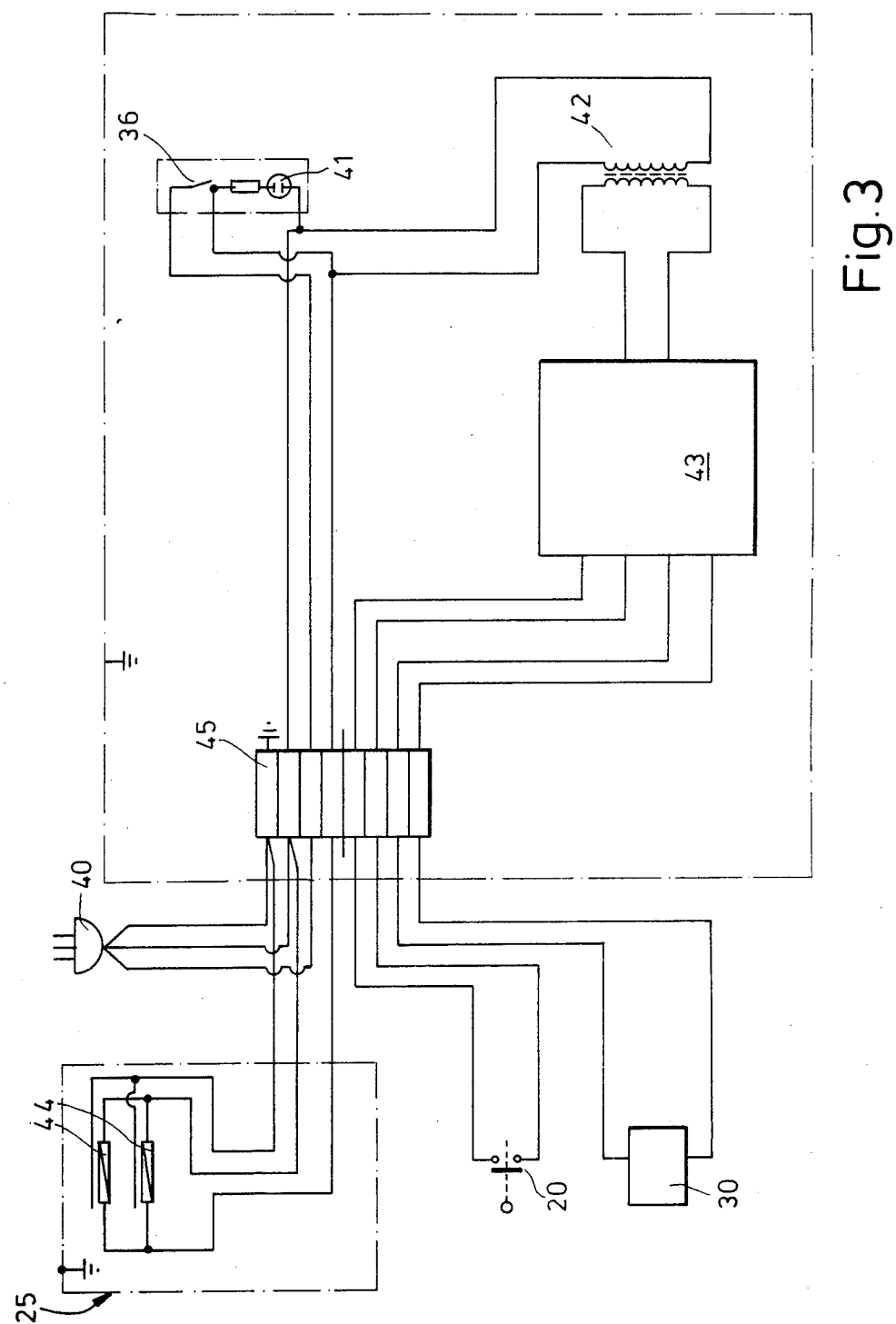
FIG. 3 is a wiring diagram of the device.

The controls of the device S are illustrated in the wiring diagram in FIG. 3. The normal electric power from the main supply is drawn via power plug 40. The heating device 25, transformer 42 and subsequent time control unit 43 and drive facility are supplied with energy via tumbler switch 36 with in-built glow lamp 41. The heating device 25 contains for example two heating elements 44 each of 600 W.

On actuating push button 20, the drive facility 30 is put into motion. This drive facility 30 operates by means of electromagnets. To this end, as shown in FIG. 4, a magnetic plate 48 is provided on the crosshead 7 and connected to the same by means of bolts, which are not shown here. The magnet 48 features at the middle an opening 50 as a passageway for a rectangular shaped bar 24 which is securely attached via threaded spindle 51 to a steel plate 52 and cover nut 33. If a voltage is applied to this facility an electromagnetic field is set up between plates 48 and 52, whereupon the upper plate in the moveable part 31b of protective casing 31 is attracted to and drawn towards the fixed magnet 48 on the crosshead 7 and the rectangular shaped bar 24 suspended in opening 50 on the threaded spindle 51 slides downwards when the two magnet plates are polarized differently. If they are given the same polarity then both parts repel each other.

The whole wiring for the individual parts is gathered at one central point 45.

The device S functions then as follows:

On switching on the device by means of tumbler switch 36 both the heating device 25 and the electronic parts such as transformer 42 and time control 43 are supplied with power. The time for heating up the heating body 26 is about 3 min.

Next a container B which is to be sealed is placed in drawer 15 and provided with a lid which is to be sealed on to it, for example a plastic foil or a carton sheet. The drawer 15 is then moved on rail 10 towards stand 21 and the push button 20 actuated.

This button 20 delivers the starting signal to the time control unit 43. This supplies the electromagnets 48 with energy e.g. a voltage supply of 12 V and at the same time starts its integrated timer. The magnetic field generated by the electromagnets acts against the force of the spiral spring 23 as a result of which the heater 26 is lowered and parts 31a and 31b of the protective casing 31 slide over each other. As soon as the heater 26 rests on the edge region 16 of the container B or the lid to be sealed on to it, which occurs after a pre-determined time—the voltage applied to the electromagnets is raised via the time control unit 43; as a result of the pressure of the heater 26, acting on the edge region 16 covered by the lid to be sealed on to it, is raised, and the container thus closed off.

After the termination of the sealing time, pre-determined by the time control unit 43, this cuts off the electrical energy supply to the electromagnets, and the heating device 25 is raised to the starting position by the mechanical energy storage means 23.

The drawer 15 can then be pushed back and the sealed container removed.

Numeral 47 indicates a further tumbler switch which is employed to switch the transformer 24 to a pre-determined higher output.

What is claimed is:

1. A process for sealing containers with a foil or the like material using a device having a heating facility mounted on a carrier with a counterpart between the heating facility and carrier and an electromagnetic field between the carrier and counterpart, which comprises: providing a device with a heating facility and with a heating element, pressing said heating element onto the container with said foil or the like material laid on said container, mounting the heating facility on a carrier, installing a counterpart between the heating facility and carrier, generating an electromagnetic field between carrier and counterpart by means of which field the carrier and counterpart are drawn together, as a result of which the heating facility moves away from the counterpart and towards the container to be sealed.

2. A process according to claim 1 in which an electromagnetic field is created between carrier and counterpart by means of which field the heating facility is returned to its starting position.

3. A process according to claim 1 wherein said heating facility is returned to its starting position by mechanical energy storage means.

4. A process according to claim 1 wherein the container is moved on a rail below the heating facility and there actuates a push-button switch which initiates the setting up of the electromagnetic field.

5. A process according to claim 1 wherein the counterpart and carrier comprise a drive unit, and including the step of controlling the drive unit by means of a time control unit.

6. A process according to claim 5 wherein said time control unit is employed to determine the duration over which the heating element applies pressure to the container and the level of the voltage applied to the drive unit.

7. A process according to claim 6 wherein after the heating element comes to rest on the container, the time control unit is employed to raise the voltage applied to the storage unit and thus raise the pressure.

8. A device for sealing containers with a foil or the like material which comprises: a heating facility, a crosshead suspending said heating facility spanning two columns and below which the container with foil or the like material is positioned, a connecting element penetrating said crosshead, a carrier connected to said heating facility by said connecting element, a counterpart penetrated by the connecting element fixed to the upper side of the crosshead between carrier and heating facility, means for producing an electromagnetic field between carrier and counterpart, by means of which field carrier and counterpart pull towards each other.

9. A device according to claim 8 wherein carrier and counterpart comprise a drive unit and said drive unit is accommodated in two parts of a protective casing, an upper part further removed from the crosshead containing and holding the carrier in the form of a plate above a lower part containing the counterpart in the form of a magnet which is securely attached to the upper side of the crosshead and such that the upper casing part is movable over the lower casing part.

10. A device according to claim 8 wherein the heating facility is connected to the crosshead via energy storage means which act against the attractive forces of the electromagnetic field.

11. A device according to claim 9 wherein the distance between said plate and magnet in the starting position can be altered by means of a threaded spindle and cover nut.

12. A device according to claim 8 including a receptacle for holding the container and a rail for holding the receptacle and container under the heating facility.

13. A device according to claim 12 wherein the rail comprises a tongue or includes a tongue which engages with a groove in the receptacle.

14. A device according to claim 8 including a push-button switch, a tumbler switch, a transformer and time control unit connected to said heating facility and drive unit in an automatic servo-control system.

15. A device according to claim 14 wherein said tumbler switch connects both the heating facility and the drive unit via the transformer and the time control unit to a main supply, whereby the actuation of the drive unit takes place only after actuating the push-button switch.

16. A device according to claim 14 wherein the time control unit includes a switch-over facility which after a pre-determined time switches over to a higher voltage.

17. A device according to claim 14 wherein a switch is provided to switch the transformer over to a higher power output.

18. A device according to claim 8 wherein the heating facility includes a heater with two heating elements.

* * * * *